United States Patent
Zhu et al.

(10) Patent No.: US 8,412,674 B2
(45) Date of Patent: Apr. 2, 2013

(54) REPLICATION RESYNCHRONIZATION

(75) Inventors: Jianbing Zhu, Shanghai (CN); Stephen C. Shepherd, Lakewood, CO (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 13/196,308

(22) Filed: Aug. 2, 2011

(65) Prior Publication Data

US 2012/0150803 A1 Jun. 14, 2012

Related U.S. Application Data

(60) Provisional application No. 61/421,010, filed on Dec. 8, 2010.

(51) Int. Cl.
 *G06F 17/30* (2006.01)
(52) U.S. Cl. ........ 707/610; 707/615; 707/638; 707/640; 707/648
(58) Field of Classification Search .................. 707/610, 707/626, 648
 See application file for complete search history.

(56) References Cited

U.S. PATENT DOCUMENTS

| | | | | |
|---|---|---|---|---|
| 6,615,223 B1 * | 9/2003 | Shih et al. | ..................... | 707/625 |
| 6,889,229 B1 * | 5/2005 | Wong et al. | .................. | 707/610 |
| 8,074,107 B2 * | 12/2011 | Sivasubramanian et al. | .. | 714/6.3 |
| 2002/0069399 A1 * | 6/2002 | Miloushey et al. | ........... | 717/108 |
| 2002/0069400 A1 * | 6/2002 | Miloushev et al. | ........... | 717/108 |
| 2002/0120924 A1 * | 8/2002 | Miloushev et al. | ........... | 717/165 |
| 2003/0056205 A1 * | 3/2003 | Miloushev et al. | ........... | 717/162 |
| 2003/0093431 A1 * | 5/2003 | Cooke et al. | .................. | 707/100 |
| 2003/0135850 A1 * | 7/2003 | Miloushev et al. | ........... | 717/165 |
| 2006/0200501 A1 * | 9/2006 | Holenstein et al. | ........... | 707/202 |
| 2006/0200533 A1 * | 9/2006 | Holenstein et al. | ........... | 709/208 |
| 2006/0212493 A1 * | 9/2006 | Aronoff et al. | ................ | 707/202 |
| 2009/0177710 A1 * | 7/2009 | Holenstein et al. | ........... | 707/201 |
| 2009/0313311 A1 * | 12/2009 | Hoffmann et al. | ............ | 707/204 |
| 2010/0114831 A1 * | 5/2010 | Gilbert et al. | ................. | 707/648 |
| 2010/0191884 A1 * | 7/2010 | Holenstein et al. | ........... | 710/200 |
| 2011/0099146 A1 * | 4/2011 | McAlister et al. | ............ | 707/634 |
| 2011/0099420 A1 * | 4/2011 | MacDonald McAlister et al. | ........................... | 714/6.32 |

* cited by examiner

*Primary Examiner* — Hanh Thai
(74) *Attorney, Agent, or Firm* — Sterne, Kessler, Goldstein & Fox PLLC

(57) ABSTRACT

System, method, computer program product embodiments and combinations and sub-combinations thereof for replication resynchronization are provided. An embodiment includes providing a mode of operation in a replication control system for repopulating a replicated version of a primary database that does not affect an ability to continue activity in the primary database. Further included is managing the repopulating of the replicated version with attention to at least a resynchronization marker.

15 Claims, 5 Drawing Sheets

REPLICATION RESYNCHRONIZATION

CROSS-REFERENCE TO RELATED APPLICATIONS

This patent application claims the benefit of U.S. Provisional Patent Application No. 61/421,010, filed Dec. 8, 2010, entitled "Replication Resynchronization," which is incorporated herein by reference in its entirety.

BACKGROUND

1. Field of the Invention

The present invention relates generally to data processing environments and, more particularly, to a system providing methodology for data replication resynchronization.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information on database management systems. Each day more and more users base their business operations on mission-critical systems which store information on server-based database systems, such as Sybase® Adaptive Server® Enterprise (ASE) (available from Sybase, Inc. of Dublin, Calif.). As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach that is used to guard against loss of critical business data maintained in a given database (the "primary database") is to maintain one or more standby or replicate databases. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to work with a copy of the database in the event of the loss, destruction, or unavailability of the primary database.

Replicate database(s) are also used to facilitate access and use of data maintained in the primary database (e.g., for decision support and other such purposes). For instance, a primary database may support a sales application and contain information regarding a company's sales transactions with its customers. The company may replicate data from the primary database to one or more replicate databases to enable users to analyze and use this data for other purposes (e.g., decision support purposes) without interfering with or increasing the workload on the primary database. The data that is replicated (or copied) to a replicate database may include all of the data of the primary database such that the replicate database is a mirror image of the primary database. Alternatively, only a subset of the data may be replicated to a given replicate database (e.g., because only a subset of the data is of interest in a particular application).

In recent years, the use of replication technologies has been increasing as users have discovered new ways of using copies of all sorts of data. Various different types of systems, ranging from electronic mail systems and document management systems to data warehouse and decision support systems, rely on replication technologies for providing broader access to data. Over the years, database replication technologies have also become available in vendor products ranging from simple desktop replication (e.g., between two personal computers) to high-capacity, multi-site backup systems.

Database replication technologies comprise a mechanism or tool for replicating (duplicating) data from a primary source or "publisher" (e.g., a primary database) to one or more "subscribers" (e.g., replicate databases). The data may also be transformed during this process of replication (e.g., into a format consistent with that of a replicate database).

In certain circumstances, it may happen that a replicate database no longer represents the contents of the primary database, due to some corruption or contamination of the replicate database, so that a desire exists to repopulate the contents of the replicate databases from the primary, and subsequently continue replication. Such resynchronization may be desired in other situations, as well, e.g., when replication latency builds past tolerable limits, including due to poor replication performance, or due to some period of time when replication was disabled or inactive.

Regardless of how the desire to resynchronize occurs, resynchronization includes a suspension of replication, re-population of the replicate database, and resumption of replication from that point. Unfortunately, currently when needing to resynchronize a replicate database, either the replication environment needs to be rebuilt to behave like first time materialization, or an individual manual process has to be devised. This issue becomes more complex when there is an inability to suspend activity on a primary database to provide a clean delineation between which transactions are contained in a database dump and which transactions are not. For example, when a primary database is used in a production environment, and business applications, e.g., financial trading, continuously generate large amounts of data per second, it becomes practically impossible to suspend the database.

Accordingly, a need exists for a manner of resynchronization that occurs with minimal interruption to the primary database environment, and with as little manual intervention within the replication domain as possible. The present invention addresses such a need.

BRIEF SUMMARY

Briefly stated, the invention includes system, method, computer program product embodiments and combinations and sub-combinations thereof for data replication resynchronization. An embodiment includes providing a mode of operation in a replication control system for repopulating a replicated version of a primary database that does not affect an ability to continue activity in the primary database. Further included is managing the repopulating of the replicated version with attention to at least a resynchronization marker.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
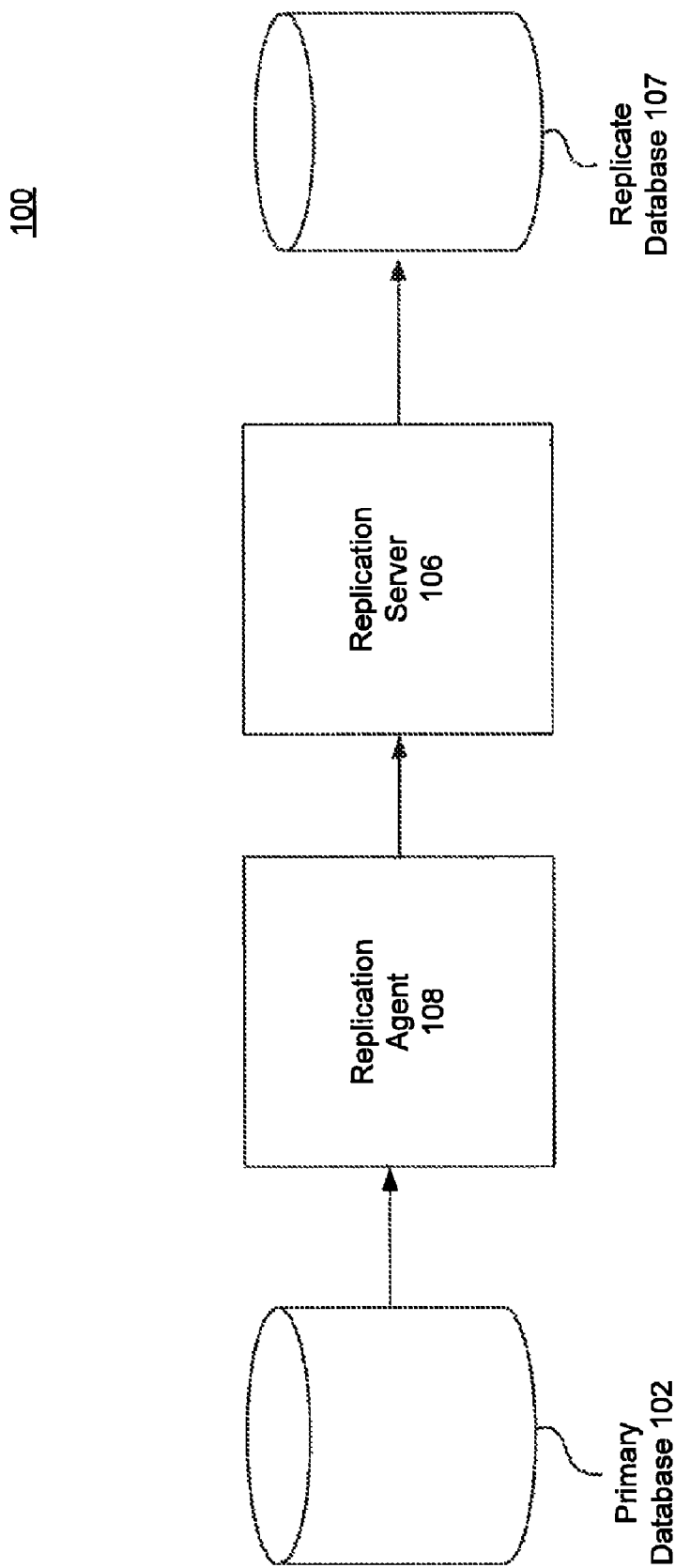
FIG. 1 illustrates a replication control system network for data replication in accordance with an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for data replication resynchronization.

Referring now to FIG. 1, a replication control system network 100 is represented where a primary database engine 102 (e.g., ASE from Sybase, Inc. of Dublin, Calif.) is able to communicate over a network with replication server 106 (e.g., Replication Server from Sybase, Inc. of Dublin, Calif.) via replication agent 108 (e.g., Replication Agent from Sybase, Inc. of Dublin, Calif.) and achieves replication resynchronization in accordance with an embodiment of the invention. The network can be any type of network or combination of networks such as, but not limited to, a local area network, wide area network, or the Internet. The network may be any form of a wired network or a wireless network, or a combination thereof.

The replication agent 108 facilitates the replication process by, in accordance with an embodiment of the present invention, scanning a transaction log for changes at primary database engine 102 and sending those changes to replication server 106. One skilled in the relevant arts will further recognize that the network 100 can be configured in a number of ways in order to achieve the same result, and the aforementioned configuration is shown by way of example, and not limitation. For instance, in accordance with an embodiment of the present invention, replication agent 108 and source database engine 102 are located in a single physical computing device or cluster of computing devices.

Primary database engine 102 comprises a primary or source database and a transaction log, in accordance with an embodiment of the present invention. Every transactional operation, including data manipulation language (DML) operations, such as inserts, updates, and deletes, and, in some environments, data definition language (DDL) operations, such as create, alter, and drop tables, to the database, causes a log record to be written to the transaction (primary) log, which is commonly referred to simply as the "log." (For further information on logging operations in a database system, see e.g., U.S. Pat. No. 6,321,234 titled "Database server system with improved methods for logging transactions"). Each particular log record characterizes the change which has occurred to the primary database during processing of a transaction. These log records can be used, for instance, in error recovery, to restore the primary database to a preexisting, consistent state.

In a traditional log-based replication system, changes to the source database are sent to replication server 106 over the network, which then applies these changes, over the network, directly to target database 107. As example of such a system is described in U.S. patent application Ser. No. 11/309,387, publication no. 20080034014, entitled "Replication System with Methodology for Replicating Stored Procedure Calls", and assigned to the assignee of the present invention. As is commonly understood, the replication server 106 starts DSI (data server interface) threads, which are responsible for transferring the data from an outbound queue to the replicate database 107. In general, DSI threads include a scheduler thread and one or more executor threads. The scheduler thread groups the transactions by commit order and dispatches them to the executor threads. The executor threads map functions to function strings and execute the transactions in the replicate database 107.

In certain circumstances, it may happen that a replicate database 107 no longer represents the contents of the primary database, due to some corruption or contamination of the replicate database 107, so that a desire exists to repopulate the contents of the replicate databases from the primary, and subsequently continue replication. Such resynchronization may be desired in other situations, such as when replication latency builds past tolerable limits, as well, including due to poor replication performance, or due to some period of time when replication was disabled or inactive. Regardless of how the desire to resynchronize occurs, resynchronization includes a suspension of replication, re-population of the replicate database, and resumption of replication from that point.

Figure 2:
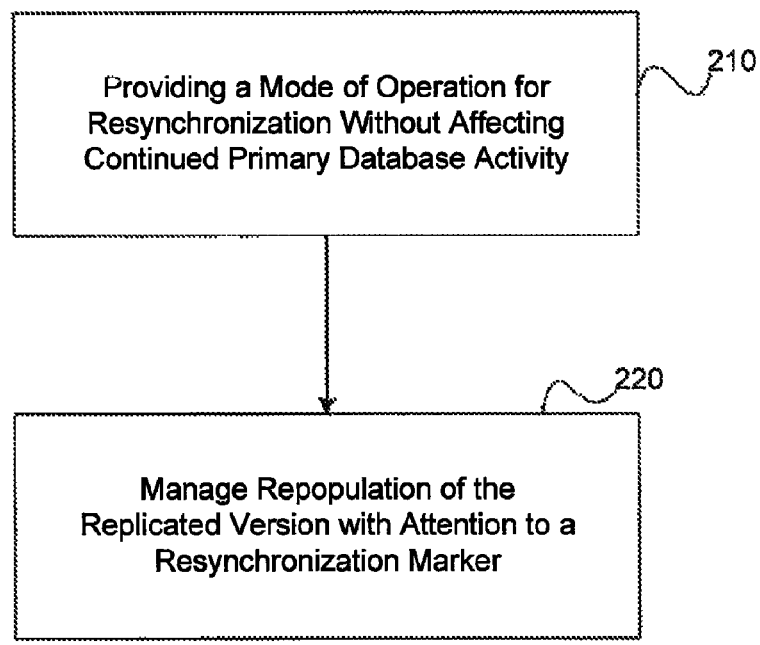
FIG. 2 is a block flow diagram illustrating an overall process for replication resynchronization in accordance with an embodiment of the invention.

In accordance with an embodiment, the database resynchronization rematerializes the replicate database and resumes further replication without loss or risk inconsistency of data, and without forcing a quiesce of a primary database. Referring now to FIG. 2, a block flow diagram representation is illustrated for an overall process of replication resynchronization in accordance with an embodiment of the invention. As shown, the process includes providing a mode of operation for resynchronization of a primary database and a replicated version of the primary database that does not affect an ability to continue activity in the primary database (block 210). In an embodiment, the mode of operation is provided as a resyac mode in the replication server 106 during which transactions are skipped and replication data is purged from replications queues in anticipation of the replicate database 107 being repopulated from a dump taken from the primary database or other trusted source, where a dump refers to the making of a backup of a database, including the data and the transaction log, such as by using a "dump" database command.

The process continues with management of the repopulating of the replicated version with attention to at least a resynchronization (resync) marker (block 220). In an embodiment, when the resync mode is specified, the resync marker is issued by the replication agent to the replication server 106 to indicate that a resynchronization effort is in progress, suitably before sending any SQL data definition language (DDL) or data manipulation language (DML) transactions.

The resync marker is utilized along with dump markers to determine transactions to apply to the replicated version, where a dump marker refers to a message written in a database transaction log to indicate when a database dump operation is completed. The managing includes identifying committed and uncommitted transactions relative to the resynchronization marker and a dump end time.

Figure 3:
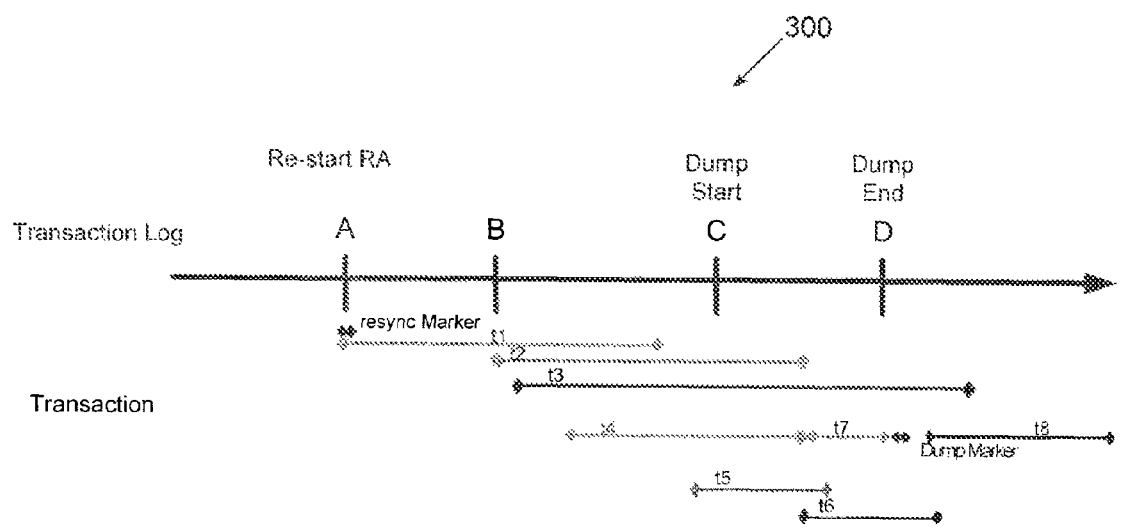
FIG. 3 illustrates a transaction diagram representation related to replication resynchronization in accordance with an embodiment of the invention.

Referring now to FIG. 3, a transaction sequence diagram is presented as an example of transaction identification in accordance with an embodiment of the invention. In diagram 300 of FIG. 3, Point A represents the starting point of a transaction t1. It also represents the point at which replication agent 108 is suspended and restarted substantially immediately as resync mode. The normal reposition point for the replication agent 108, based on a replication server 106 truncation point could be anywhere prior to the decision to dump the database, shown as Dump Start, point C. For display purposes, point A is used, at which a "resync" marker would be produced. Point B represents the starting point of transaction t2, which is also the Oldest Open Transaction at the time the dump starts (point C). Point D represents the ending point of the dump (Dump End). A dump database marker needs to be generated and sent to replication server 106 at this point. As shown, transactions t1, t2, t4, t5, t7 all commit prior the Dump End. Accordingly, they should all exist in the dump completed at point D. As they are included in the dump, the replication server does not apply these transactions. However, the transactions t3, t6, t8 do not exist in the dump contents, because they committed after the dump ended. They must be sent, in their entirety, to replication server 106, so that replication server can apply them. After the replication resynchronization is completed with application of the dump to the replicate database 107, the standard replication processing proceeds.

Figure 4:
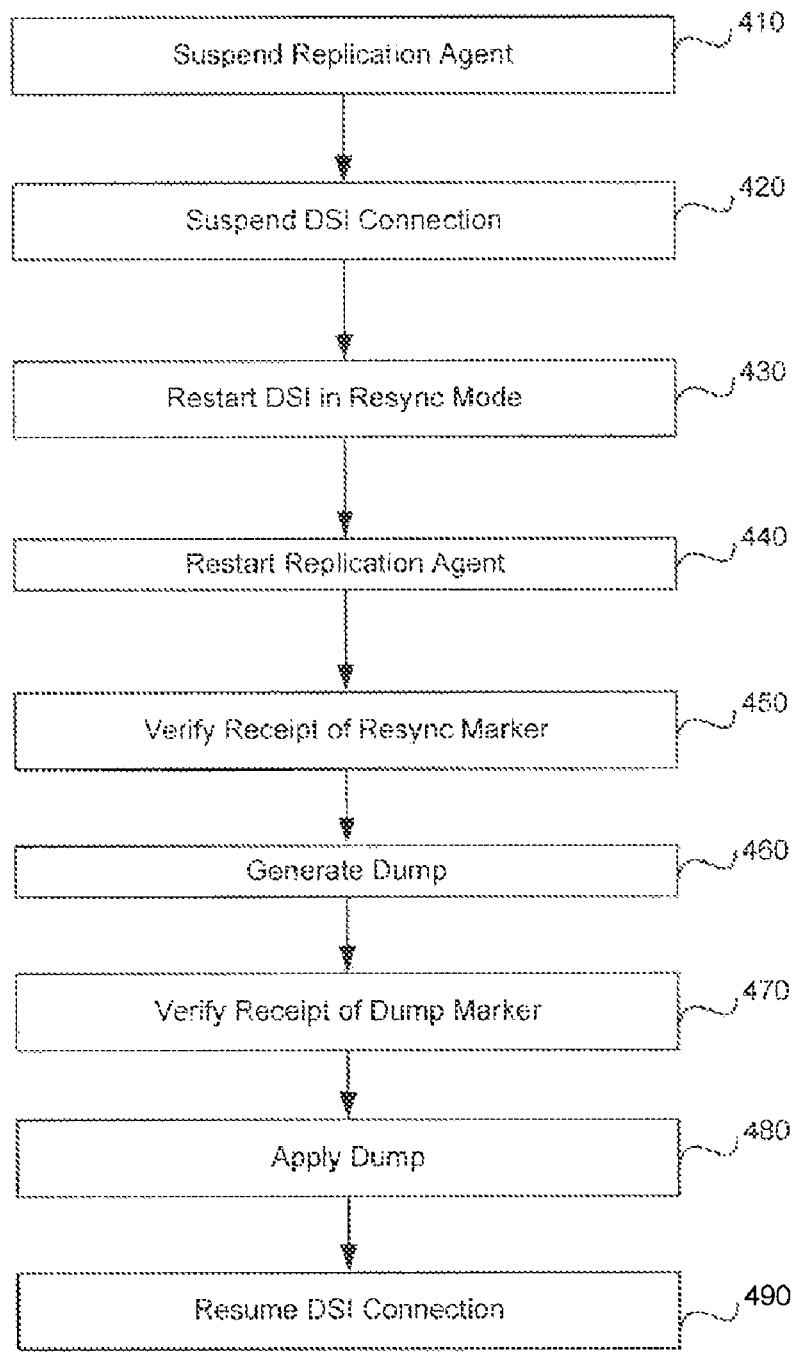
FIG. 4 is a block flow diagram illustrating an alternate perspective of replication resynchronization in accordance with an embodiment of the invention.

The utilization of the replication resynchronization suitably occurs upon selection by a replication system network administrator. By way of example, FIG. 4 illustrates a block flow diagram illustrating a representation of database resynchronization from the perspective of a replication system administrator in accordance with an embodiment of the invention. The process initiates with the stopping of replication by suspending the replication agent 108 (block 410), e.g., using a "suspend" command. The replication server DSI connection to the primary database is also suspended (block 420), e.g., using a "suspend connection to data_server.database".

Then, the replication server DSI is restarted in resync mode (block 430), e.g., using a "resume connection to data_server.database skip to resync marker" command. As mentioned previously, in resync mode, the replication server 106 skips transactions and purges data from the replication queues. The replication agent 108 is also restarted (block 440), e.g., using a "resume resync" command. This resumption causes the replication agent 108 to send the resync marker to the replication server 106 to indicate a resynchronization operation is in progress.

A verification that the resync marker has been received by the DSI follows (block 450), such as by looking for a message in the replication server 106 system log, e.g., "DSI for data_server.database received and processed Resync Database Marker. Waiting for Dump Marker." The DSI connection automatically suspends after replication server 106 receives the dump database marker.

Once verified, a database dump is generated (block 460) using standard dump techniques as appropriate for a given environment. Expected as part of these techniques is the generation of the dump database markers. Accordingly, verification of processing of the dump database markers follows (block 470), such as by looking for a message in the replication server 106 system log, e.g., "DSI for data_server.database received and processed Dump Marker. DSI is now suspended. Resume after database has been reloaded" After applying the dump through standard techniques to the replicate database 107 (block 480), the DSI connection is resumed (block 490), e.g., using a "resume connection to data_server.database" command.

Types of environments supported by the embodiments of the invention are the resynchronization of one or more replicate databases from one primary database. Alternatively, the features of the embodiments may also be applied for resynchronization of both the primary and replicate databases from the same dump, e.g., a "golden" copy. In such a situation, there is no dump database activity. By providing an "init" parameter with the "resume resync" command, the init keyword allows replication agent 108 to restart in resync mode, instructing the replication server 106 to purge all the open transactions in the inbound queues, suspend DSI connections and not wait for 'dump database' marker.

In a further alternative, when a non-native dump utility is utilized, dump database markers are needed to be generated, when the utility does not record anything in the primary database transaction log that replication agent 108 can use to generate the dump database marker. For example, when using a disk replication tool, the activity at the primary database can be temporarily halted to eliminate transactions in progress from the disk snapshot, with the "end of transaction log" point providing the dump database marker.

In yet another alternative, the active and standby databases in a warm standby application can be resynchronized. In such a scenario, the "init" parameter of the "resume resync" is utilized for the active database, along with the verification that the DSI for the standby database has been received and accepted. Both the active and standby databases need their DSI resumed.

Figure 5:
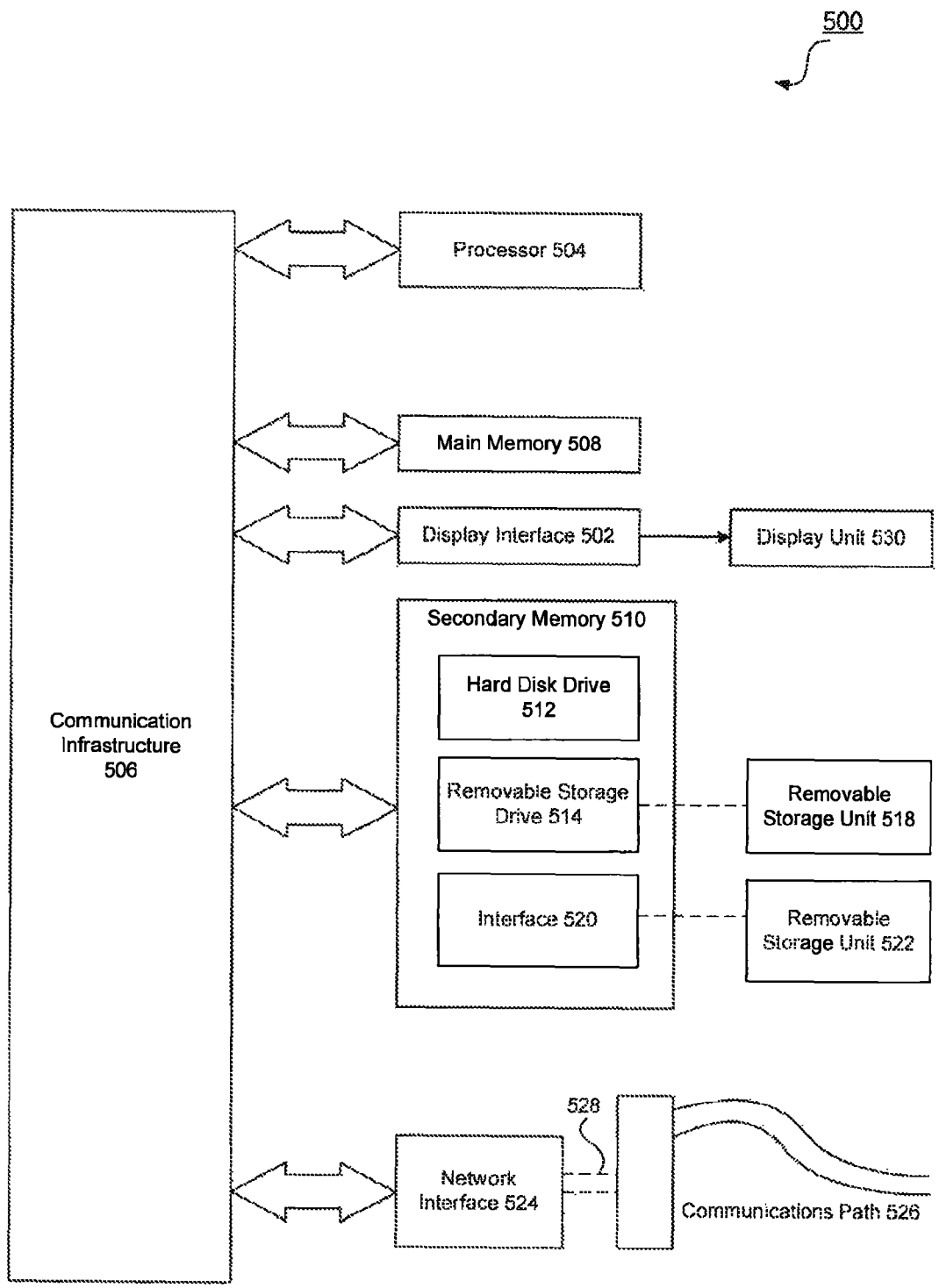
FIG. 5 illustrates an example computer useful for implementing components of embodiments of the invention.

FIG. 5 illustrates an example computer system 500 in which the present invention, or portions thereof, can be implemented as computer-readable code. For example, the methods illustrated by flowchart of FIGS. 2 and 4, can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

in alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 408 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the method illustrated by the flowchart of FIGS. 2 and/or 4. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for database replication resynchronization comprising:

providing a mode of operation in a replication control system for repopulating a replicated version of a primary database that does not affect an ability to continue activity in the primary database; and managing the repopulating of the replicated version, the managing comprising:

obtaining a data dump from a trusted data source with attention to at least a resynchronization marker indicating that database synchronization is in progress and a dump marker indicating the dump end time; and determining transactions to apply to the replication version relative to the resynchronization marker and the dump end time, wherein the primary database is stored in a computer memory, and the mode of operation in the replication control system executes on one or more processors.

2. The method of claim 1, wherein providing a mode of operation further comprises providing a mode of operation in the replication control system that supports skipping tansactions and purging replication data from replication queues.

3. The method of claim 1, wherein determining transactions to apply further comprises identifying committed and uncommitted transactions.

4. The method of claim 1, wherein the trusted data source further comprises the primary database.

5. The method of claim 1, further comprising reestablishing replication following application of the data dump.

6. An apparatus for data replication resynchronization comprising:

a computer memory;

one or more processors coupled to the computer memory;

a primary database stored in the computer memory; and a replication control system configured to:

provide a mode of operation to repopulate a replicated version of the primary database that does not affect an ability to continue activity in the primary database;

manage the repopulation of the replicated version with attention to at least a resynchronization marker, wherein to manage the repopulation of the replicated version the replication control system is further configured to:
  obtain a data dump from a trusted data source with attention to at least a resynchronization marker indicating that database synchronization is in progress and a dump marker indicating the dump end time; and
  determine transactions to apply to the replication version relative to the resynchronization marker and the dump end time,
wherein the replication control system executes on the one or more processors.

7. The apparatus of claim 6, wherein the replication control system further supports skipping transactions and purging replication data from replication queues during the mode of operation.

8. The apparatus of claim 7, wherein the replication control system further reestablishes replication following application of the data dump.

9. The apparatus of claim 6, wherein the replication control system futher determines transactions to apply by identifying committed and uncommitted transactions relative to the resynchronization marker and a dump end time.

10. The apparatus of claim 6, wherein the trusted data source further comprises the primary database.

11. A computer program product including a non-transitory computer-readable medium having instructions stored thereon that, if executed by a computing device, cause the computing device to perform operations for data replication resynchronization, the instructions comprising:
  utilizing a mode of operation in a replication control system for repopulating a replicated version of a primary database that does not affect an ability to continue activity in the primary database; and
  managing the repopulating of the replicated version, the managing comprising:
    obtaining a data dump from a trusted data source with attention to at least a resynchronization marker indicating that database synchronization is in progress and a dump marker indicating the dump end time; and
    determining transactions to apply to the replication version relative to the resynchronization marker and the dump end time,
  wherein the primary database is stored in memory and the mode of operation in the replication control system executes on a processor.

12. The computer program product of claim 11, wherein utilizing a mode of operation further comprises utilizing a mode of operation in the replication control system that supports skipping transactions and purging replication data from replication queues.

13. The computer program product of claim 11, wherein determining transactions to apply further comprises identifying committed and uncommitted transactions.

14. The computer program product of claim 11, wherein the trusted data source further comprises the primary database.

15. The computer program product of claim 11, further comprising reestablishing replication following application of the data dump.

* * * * *